(12) United States Patent
Tomimoto

(10) Patent No.: US 7,522,833 B2
(45) Date of Patent: Apr. 21, 2009

(54) IMAGE-TAKING APPARATUS EQUIPPED WITH SOUND PROCESSING FUNCTION

(75) Inventor: Honkai Tomimoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 480 days.

(21) Appl. No.: 11/391,661

(22) Filed: Mar. 28, 2006

(65) Prior Publication Data

US 2006/0222357 A1    Oct. 5, 2006

(30) Foreign Application Priority Data

Mar. 30, 2005    (JP)    ............................... 2005-098097

(51) Int. Cl.
G03B 15/03    (2006.01)
G03B 17/24    (2006.01)
(52) U.S. Cl. ........................................ 396/312; 396/176
(58) Field of Classification Search ................. 396/176, 396/177, 178, 312, 535; 348/371, 373
See application file for complete search history.

(56) References Cited

U.S. PATENT DOCUMENTS

| 2005/0041120 | A1* | 2/2005 | Miller | 348/239 |
| 2005/0220448 | A1* | 10/2005 | Tei et al. | 396/25 |
| 2005/0280736 | A1* | 12/2005 | Baba | 348/371 |
| 2006/0002696 | A1* | 1/2006 | Onishi et al. | 396/85 |

* cited by examiner

Primary Examiner—Rodney E Fuller
(74) Attorney, Agent, or Firm—Cowan, Liebowitz & Latman, P.C.

(57) ABSTRACT

An image-taking apparatus is disclosed, which has an effective arrangement of sound input or output portion. The image-taking apparatus comprises a main body, a lens barrel provided on a front face side of the main body, an illumination unit which illuminates an object and is provided on the top face of the main body. The front face of the illumination unit is arranged at a position closer to the object than the front face of the main body. The apparatus further comprises a sound input/output portion. In a direction orthogonal to the bottom face of the main body, at least a part of the sound input/output portion is provided in an area between the periphery of the lens barrel and the illumination unit on the front face of the main body.

10 Claims, 4 Drawing Sheets

IMAGE-TAKING APPARATUS EQUIPPED WITH SOUND PROCESSING FUNCTION

BACKGROUND OF THE INVENTION

The present invention relates to an image-taking apparatus which has a sound (voice) processing function.

Digital still cameras capable of taking video images are recently increased, and these cameras generally have a microphone for inputting sound in their camera bodies. Further, digital still camera capable of inputting not only conventional monaural sound but also stereo sound is increased. In contrast, most video cameras have a stereo sound inputting function.

The miniaturization of digital still cameras requires an effective arrangement of stereo microphones.

Japanese Patent Application Laid-Open No.2000-165718 discloses a stereo microphone technique of a video camera which has three microphones that the two of them are arranged in the horizontal and vertical directions with respect to the other as a vertex around an image-taking lens, three amplifiers each amplifying the output from each of the microphones, and a sound signal processing circuit selecting the two outputs from the three amplifiers to output them as left and right sound signals depending on the orientation of a CCD image-pickup element.

As described above, Japanese Patent Application Laid-Open No.2000-165718 discloses a stereo sound input system capable of changing the microphones depending on the orientation of the camera. However, the publication does not disclose an effective arrangement of the stereo microphones for the miniaturization of the camera.

BRIEF SUMMARY OF THE INVENTION

One object of the present invention is to provide an image-taking apparatus which has an effective arrangement of a sound input portion for inputting sound. Another object of the present invention is to provide an image-taking apparatus which has an effective arrangement of a sound output portion for outputting sound. Yet another object of the present invention is to provide an image-taking apparatus which has an effective arrangement of a sound processing portion for processing sound.

According to an aspect, the present invention provides an image-taking apparatus which comprises a main body of the image-taking apparatus, a lens barrel which is provided on a front face side of the main body, and an illumination unit which illuminates an object and is provided on the top face of the main body, the front face of the illumination unit being arranged at a position closer to the object than the front face of the main body. The apparatus further comprises a sound input portion through which sound is input, the sound input portion being provided on the front face of the main body. In a direction orthogonal to the bottom face of the main body, at least a part of the sound input portion is provided in an area between the periphery of the lens barrel and the illumination unit on the front face of the main body.

According to another aspect, the present invention provides an image-taking apparatus which comprises a main body of the image-taking apparatus, a lens barrel which is provided on a front face side of the main body, and an illumination unit which illuminates an object and is provided on the top face of the main body, the front face of the illumination unit being arranged at a position closer to the object than the front face of the main body. The apparatus further comprises a sound output portion through which sound is output, the sound output portion being provided on the front face of the main body. In a direction orthogonal to the bottom face of the main body, at least a part of the sound output portion is provided in an area between the periphery of the lens barrel and the illumination unit on the front face of the main body.

According to yet another aspect, the present invention provides an image-taking apparatus which comprises a main body of the image-taking apparatus, a lens barrel which is provided on a front face side of the main body, and an illumination unit which illuminates an object and is provided on the top face of the main body, the front face of the illumination unit being arranged at a position closer to the object than the front face of the main body. The apparatus further comprises a sound processing portion which processes sound, the sound processing portion being provided in the main body. In a direction orthogonal to the bottom face of the main body, at least a part of the sound processing portion is provided in an area between the periphery of the lens barrel and the illumination unit in the main body.

Other objects and features of the present invention will become readily apparent from the following description of the preferred embodiments with reference to accompanying drawings.

DETAILED DESCRIPTION OF THE PREFERRED EMBODIMENTS

Preferred embodiments of the present invention will hereinafter be described with reference to the drawings.

Figure 1:
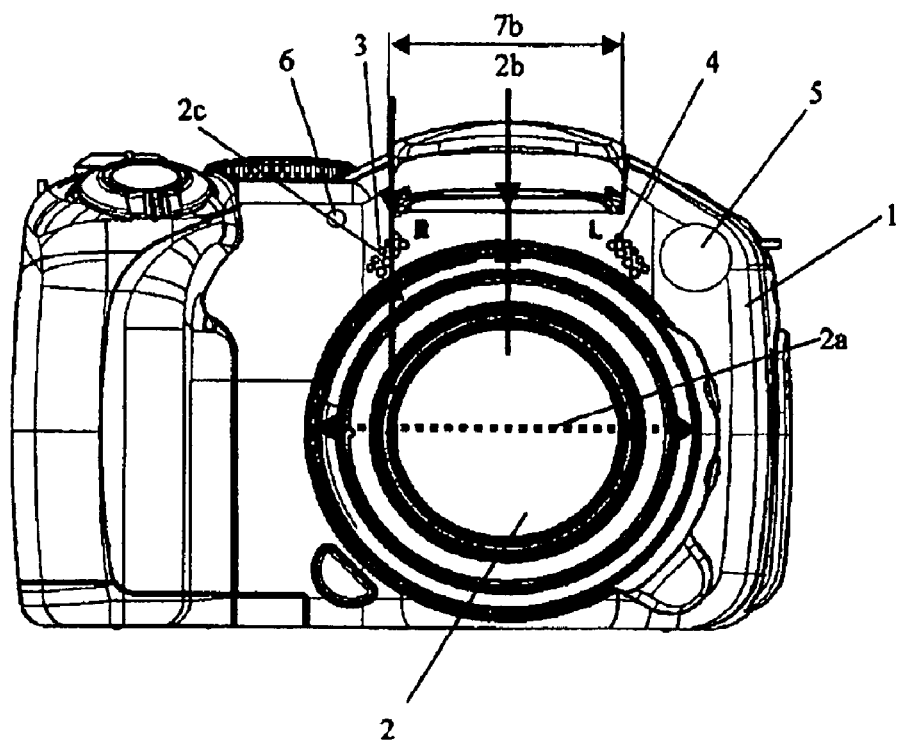
FIG. 1 is a front view showing a digital still camera that is an embodiment of the present invention.

FIG. 1 is a front view that shows a digital still camera that is an embodiment of the present invention.

Figure 2:
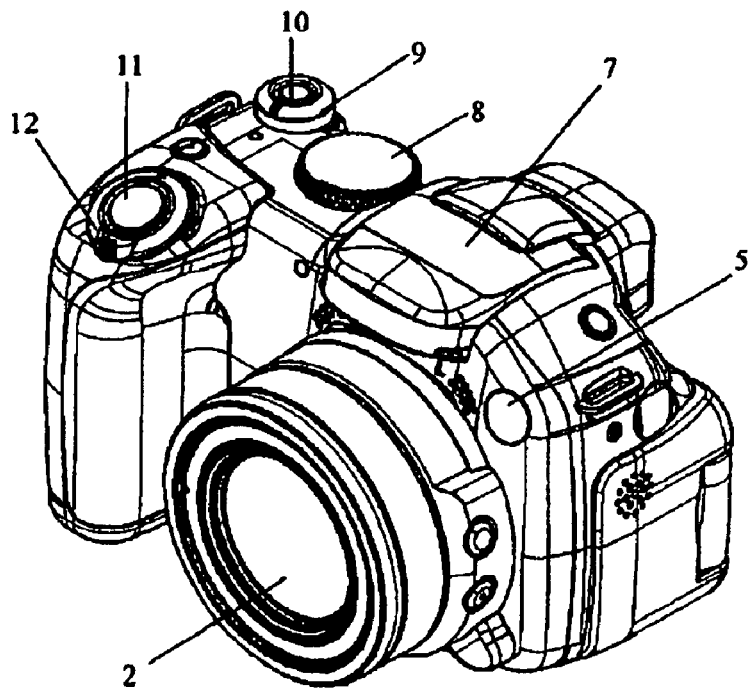
FIG. 2 is an oblique perspective view showing the digital still camera of the embodiment.
Figure 3:
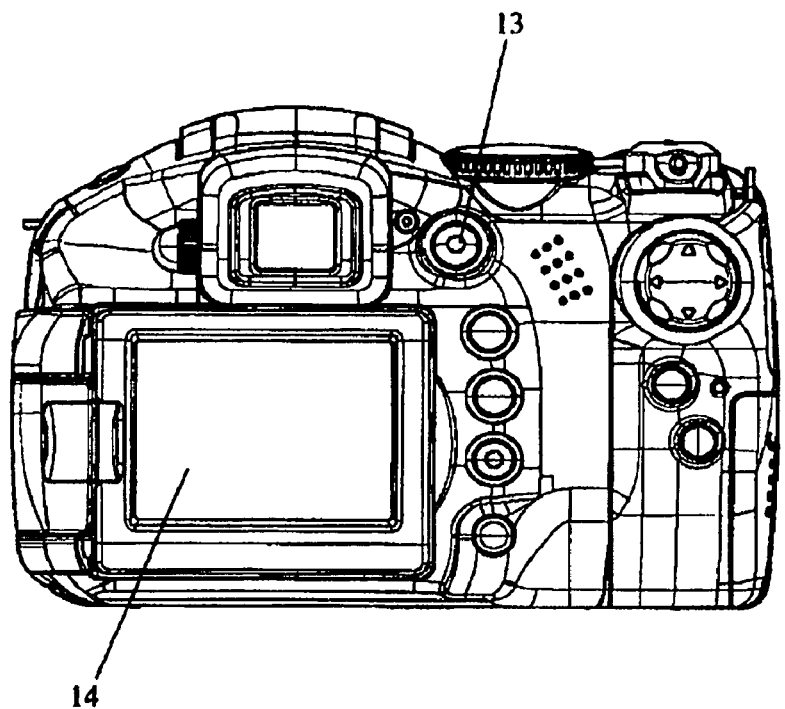
FIG. 3 is a rear view showing the digital still camera of the embodiment.
Figure 4:
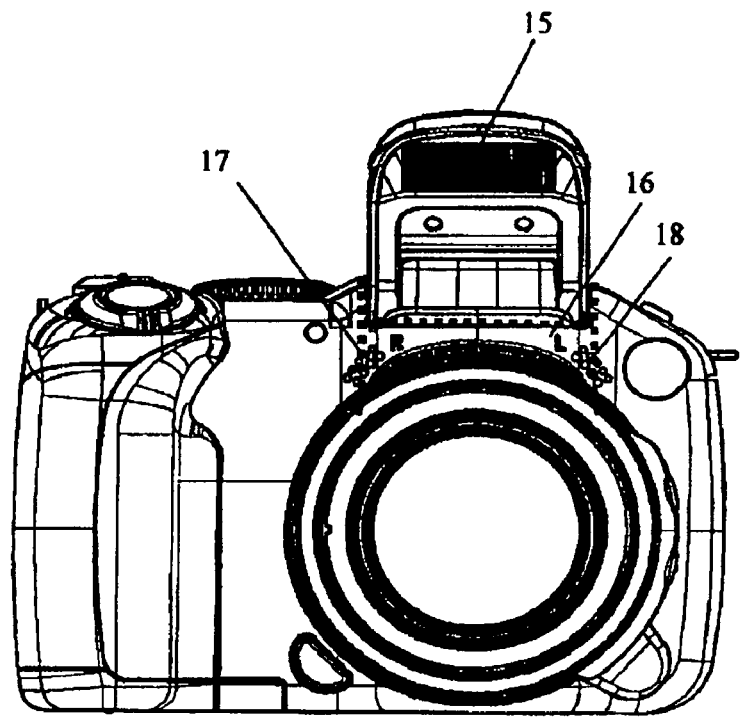
FIG. 4 is a front view showing the digital still camera of the embodiment, in which its flash unit is popped up.
Figure 5:
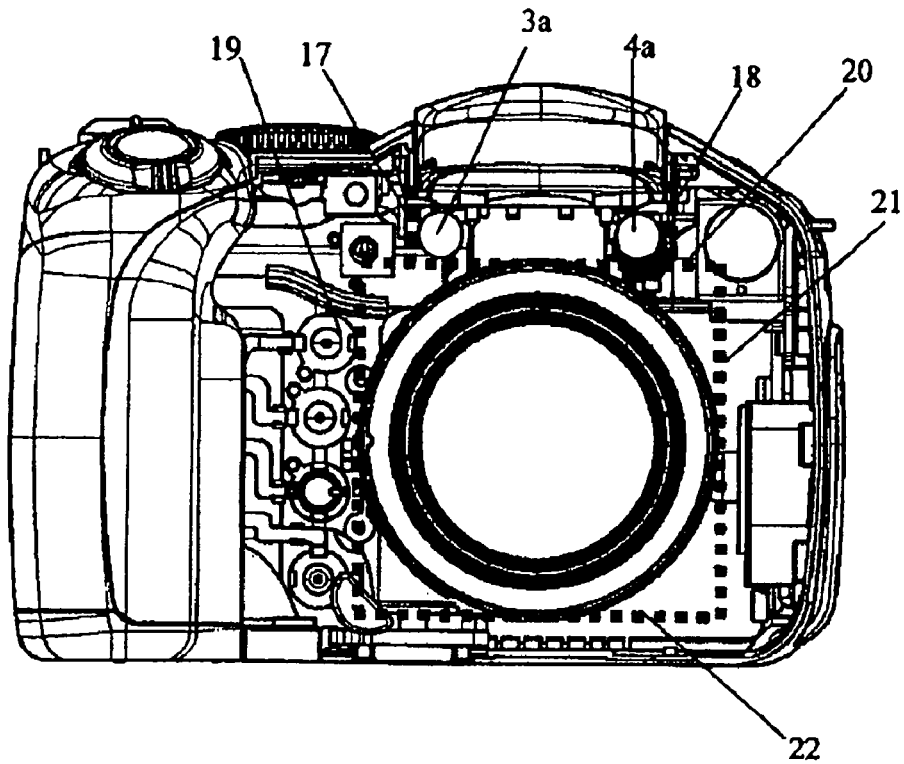
FIG. 5 is a front view showing the digital still camera of the embodiment, in which its front cover is removed.
Figure 6:
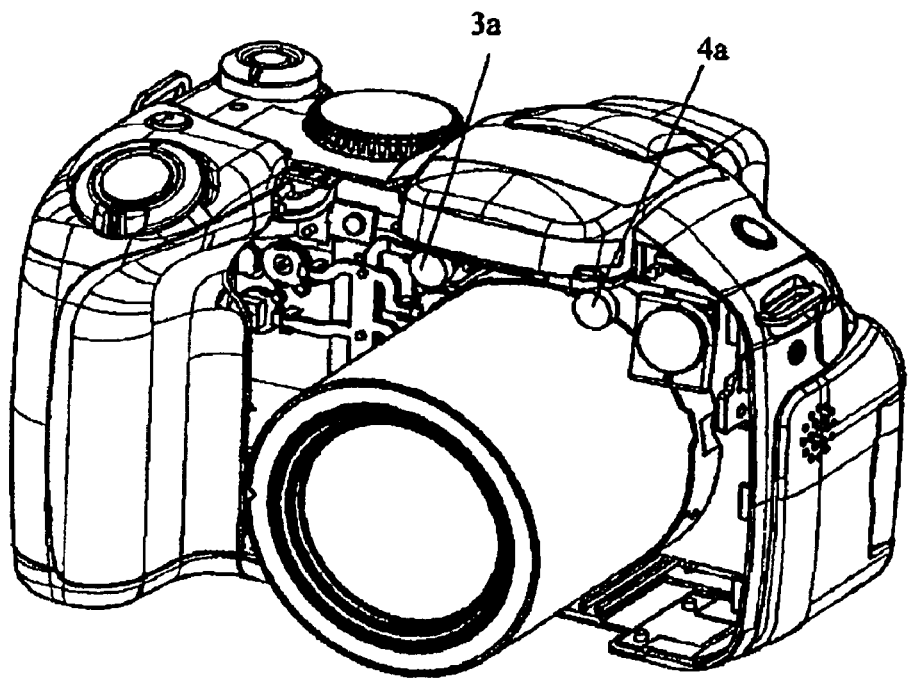
FIG. 6 is an oblique perspective view showing the digital still camera shown in FIG. 5.
Figure 7:
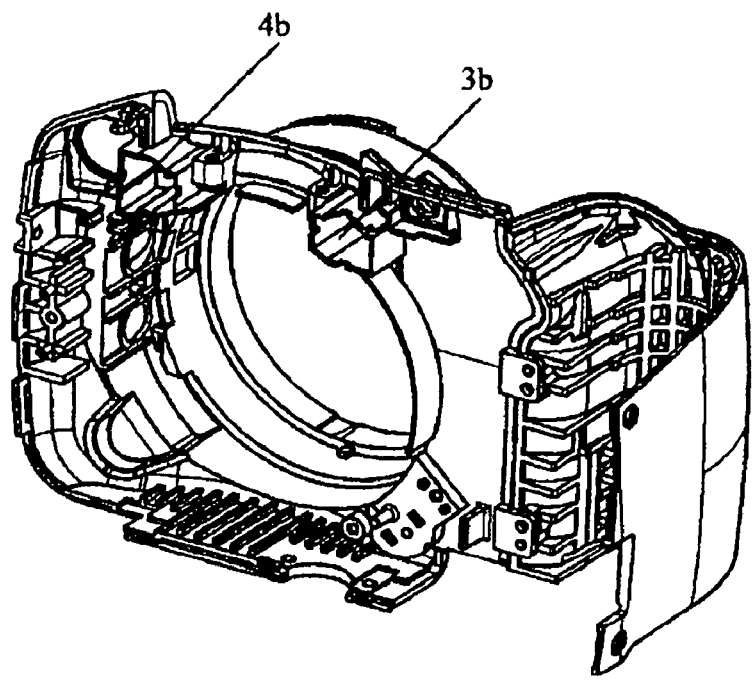
FIG. 7 is an oblique perspective view showing the front cover of the digital still camera of the embodiment.
Figure 8:
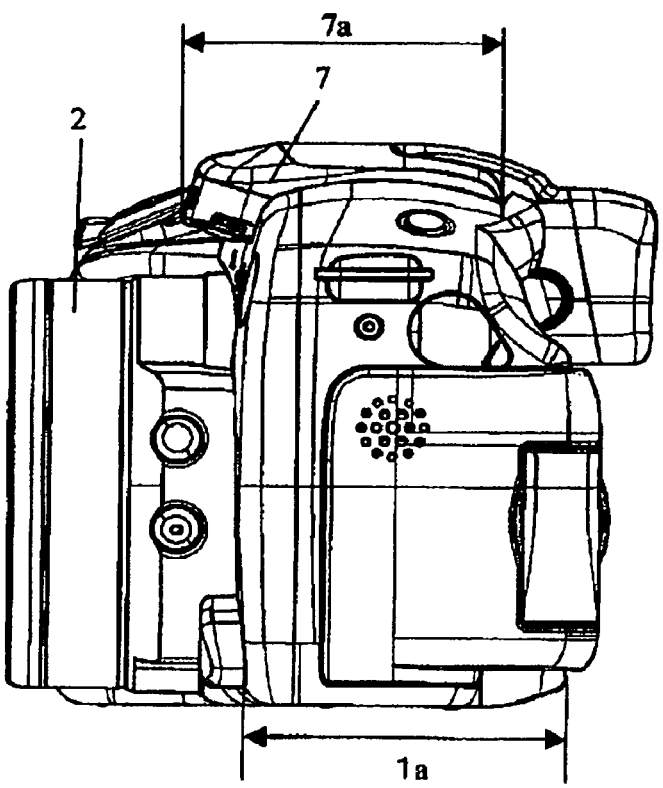
FIG. 8 is a side view showing the digital still camera of the embodiment.

FIG. 2 is an oblique perspective view of the digital still camera when viewed from an angle different from that of FIG. 1. FIG. 3 is a rear view that shows the digital still camera. FIG. 4 is a front view that shows the digital still camera in which its flash unit is popped up. FIG. 5 is a front view that shows the digital still camera in which its front cover is removed. FIG. 6 is an oblique perspective view that shows the digital still camera shown in FIG. 5. FIG. 7 is an oblique perspective view that shows the front cover of the digital still camera. FIG. 8 is a side view that shows the digital still camera.

In these figures, 1 denotes a main body of the digital still camera, which is equipped with a sound recording device. 2 denotes a lens barrel which contains an image-taking optical system. 3 denotes a right (R)-channel-microphone hole for inputting and recording ambient sound in stereo when taking video images, an acoustic element such as a microphone being provided in the R-channel-microphone hole. 3a denotes a R-channel microphone. 3b denotes a rib portion for holding the R-channel microphone 3a.

4 denotes a left (L)-channel-microphone hole for inputting and recording ambient sound in stereo when taking video images with the R-channel microphone, an acoustic element such as a microphone being provided in the L-channel-microphone hole. 4a denotes an L-channel microphone. 4b denotes a rib portion for holding the L-channel microphone 4a.

5 denotes an AF-assist LED for automatically emitting AF-assist light which assists auto-focusing (AF) when taking images of a dark scene that it is difficult to work the AF. 6 denotes a red-eye-reduction LED for reducing a red eye when taking images with flash light. 7 denotes a flash unit for emitting flash light towards an object with a low illuminance when image-taking. 8 denotes a mode dial for selecting an image-taking mode such as an aperture priority mode and a shutter-speed priority mode. 9 denotes an image-taking/replaying select lever for selecting one of an image-taking mode in which image-taking (recording) is performed and a replaying mode in which taken images can be observed. The operation of the image-taking/replaying select lever around a power-off button 10 switches between the image-taking mode and the replaying mode. Further, the operation of the image-taking/replaying select lever towards any one of the image-taking mode and the replaying mode turns the power on. The power-off button 10 is provided for turning the power off.

11 denotes a release button for stating image-taking. 12 denotes a zoom lever for adjusting the field angle for image-taking. 13 denotes a video-taking button for starting and finishing video-taking. 14 denotes an LCD displaying portion which displays unrecorded video images before image-taking and taken images. 15 denotes a flash-light guide.

16 denotes a space (or area) between the lens barrel 2 and the flash unit 7 in the vertical direction (or a direction orthogonal to the bottom face of the main body 1).

Although the description here is made of a digital still camera equipped with a sound recording device, the present invention can be applied to other image-taking apparatuses such as a video camera.

Next, the description will be made of the arrangement of the microphones 3a and 4a in this embodiment.

It is preferable that the flash unit 7 be placed as distant as possible from the optical axis of the lens barrel 2 in order to obtain a good performance of the flash unit 7 and reduce a red eye of the object. However, it is not easy to place the flash unit 7 at a position distant from the optical axis of the lens barrel 2 due to the requirement of miniaturization of digital still cameras. Therefore, in this embodiment, the flash unit 7 is placed above the lens barrel 2 as shown in FIG. 1, and configured so that is can rotate around an unillustrated axis between a retract position where it closes to the top face of the main body 1 and an image-taking position where it is popped up from the top face of the main body 1 and the light guide 15 faces the object, as shown in FIG. 4.

Adopting the above-described configuration of the flash unit 7 and the lens barrel 2 makes it possible to improve the performance of the flash unit 7 and reduce the red eye without increasing the size of the digital still camera.

Moreover, it is preferable that the R and L-channel microphones (hereinafter referred to stereo microphones) 3a and 4a be arranged bilaterally-symmetrically with respect to the optical axis of the lens barrel 2 for a good LR-stereophonic performance. Further, in a case where the stereo microphones 3a and 4a are arranged distantly from each other, the bilaterally-symmetrical arrangement is preferable for the appearance (design) of the digital still camera.

On the other hand, when the flash unit 7 and the lens barrel 2 are arranged so that the flash light optical axis of the flash unit 7 is located above and at the substantially same horizontal position as the optical axis of the lens barrel 2, a space 16 which is surrounded by the lower face of the flash unit 7, a first tangent line 17 tangent to the left outline of the flash unit 7, the second tangent line 18 parallel to the first tangent line 17 and tangent to the right outline of the flash unit 7, and the periphery of the lens barrel 2, between the flash unit 7 and the lens barrel 2, as shown in FIG. 5.

Therefore, arranging the stereo microphones 3a and 4a in the space 16 makes it possible to improve the space efficiency due to the effective utilization of the space 16 that is a wasted space originally, thereby resulting in the improvement of the performance of the stereo microphone and the appearance (design) of the digital still camera, while maintaining the miniaturization of the digital still camera.

The flash unit 7 is a pop-up flash unit as described above. An arm 7a that holds the light guide 15 is longer than the thickness (or the length in the optical axis direction) 1a of the main body 1. This is effective for reducing the red eye because the red-eye reduction requires that the flash unit 7 be located as distant as possible from the optical axis of the lens barrel 2. To miniaturize the digital still camera, the flash unit 7 which is not used for image-taking is rotated to a retract position where the lower face of the flash unit 7 is close to the periphery of the lens barrel 2. The light guide 15 of the flash unit 7 located at the retract position protrudes more forward than the front cover of the main body 1 as shown in FIG. 8. The lens barrel 2 also protrudes more forward than the front cover of the main body 1 as shown in FIG. 8.

A characteristic of the digital still camera 1 equipped with the stereo microphones 3a and 4a and the lens barrel (or image-taking lens) 2 having a high magnification ratio is as follows.

To achieve the high magnification ratio, the diameter of the lens barrel 2 is increased, and the proportion of the lens barrel 2 of the main body 1 is also increased. Moreover, the flash unit 7 requires a flash performance corresponding to the performance of the high-magnification lens barrel 2 when taking images with a large magnification. This widens the width 7b of the flash unit 7. Further, the flash unit 7 is placed above the lens barrel 2 for miniaturizing the digital still camera, and is a pop-up flash unit for preventing the flash light from being intercepted by the lens barrel 2 when image-taking. Therefore, a wasted space is formed between the lens barrel 2 and flash unit 7 as described above.

Arranging the stereo microphones 3a and 4a in the space 16 makes it possible to improve the space efficiency due to the effective utilization of the space 16 that is a wasted space originally, thereby resulting in the improvement of the stereo microphone's performance and the appearance (design) of the digital still camera, while maintaining the miniaturization of the digital still camera.

The relationship of the dimensions of the digital still camera equipped with the stereo microphones 3a and 4a and the high-magnification lens barrel 2 is as follows.

The lens barrel 2 has a diameter 2a of 50 to 60 mm, and the flash unit 7 has a width 7b of approximately 30 to 35 mm because of its performance corresponding to the high magnification ratio of the lens barrel 2. The gap 2b between the lens barrel 2 and the flash unit 7 is set to the minimum width based on the pop-up mechanism of the flash unit 7, the gap width being approximately 3 to 6 mm. Each of the stereo microphones 3a and 4a has a diameter of approximately 6 mm.

Therefore, it is possible to arrange the stereo microphones 3a and 4a in the space 16 surrounded by the lower face of the flash unit 7, the periphery of the lens barrel 2, the first tangent line 17 tangent to the left outline of the flash unit 7 and the second tangent line 18 parallel to the first tangent line 17 and tangent to the right outline of the flash unit 7.

The space 16 surrounded by the lower face of the flash unit 7, the periphery of the lens barrel 2, the first tangent line 17 tangent to the left outline of the flash unit 7 and the second tangent line 18 parallel to the first tangent line 17 and tangent to the right outline of the flash unit 7 has a maximum dimension part 2c having a dimension equal to approximately 10 to 15 mm or less. Since a normal user's finger has a diameter equal to 15 mm or more, inserting the finger into the space 16 is difficult. Therefore, the possibility that the microphone holes 3 and 4 are blocked by the finger is reduced, thereby assuring the sound input.

As described above, in this embodiment, the stereo microphones 3a and 4a are arranged in the space 16 which is surrounded by the lower face of the flash unit 7, the periphery of the lens barrel 2, the first tangent line 17 tangent to the left outline of the flash unit 7 and the second tangent line 18 parallel to the first tangent line 17 and tangent to the right outline of the flash unit 7. This can improve the stereo sound performance of the digital still camera. Further, the above effective arrangement of the stereo microphones can miniaturize the digital still camera, and the arrangement of the stereo microphones in which the microphones are difficult to be blocked by fingers can assure the sound input.

Although the description was made of a case where the stereo microphones were arranged in the space 16 surrounded by the lower face of the flash unit 7, the periphery of the lens barrel 2, the first tangent line 17 tangent to the left outline of the flash unit 7 and the second tangent line 18 parallel to the first tangent line 17 and tangent to the right outline of the flash unit 7 in this embodiment, other sound input/output electrical elements such as a monaural microphone, stereo speakers or a monaural speaker may be arranged in the space 16.

Further, although the description was made of a case where the flash unit 7 was placed above the lens barrel 2 in this embodiment, the same effect can be obtained in a case where the flash unit 7 is placed below the lens barrel 2 or a case where the flash unit 7 is arranged concentrically with the lens barrel 2.

Further, although the description was made of a case where the optical axis of the flash unit 7 and the optical axis of the lens barrel 2 were located at the substantially same horizontal position in this embodiment, the same effect can be obtained in a case where the optical axis of the flash unit 7 displaces with respect to the optical axis of the lens barrel 2 in the horizontal direction because a space similar to the space 16 is formed between the flash unit 7 and the lens barrel 2.

Moreover, although the description was made of a case where the horizontal width of the flash unit was smaller than the diameter of the lens barrel 2, the same effect can be obtained in a case where the horizontal width of the flash unit 7 was larger than the diameter of the lens barrel 2.

This application claims a foreign priority benefit based on Japanese Patent Applications No. 2005-098097, filed on Mar. 30, 2005, which is hereby incorporated by reference herein in its entirety as if fully set forth herein.

What is claimed is:

1. An image-taking apparatus comprising:
a main body of the image-taking apparatus;
a lens barrel which is provided on a front face side of the main body;
an illumination unit which illuminates an object and is provided on a top face of the main body; and
a sound input portion through which sound is input, the sound input portion being provided on a front face of the main body,
wherein, in a direction orthogonal to a bottom face of the main body, at least a part of the sound input portion is provided in an area between a periphery of the lens barrel and the illumination unit on the front face of the main body and,
wherein, in a direction horizontal to the bottom face of the main body, at least a part of the sound input portion is provided in an area between tangent lines respectively tangent to both side outlines of the illumination unit.

2. The image-taking apparatus according to claim 1, wherein the sound input portion is a plurality of openings formed on the front face of the main body to input the sound.

3. An image-taking apparatus comprising:
a main body of the image-taking apparatus;
a lens barrel which is provided on a front face side of the main body;
an illumination unit which illuminates an object and is provided on a top face of the main body; and
a sound output portion through which sound is output, the sound output portion being provided on a front face of the main body,
wherein, in a direction orthogonal to a bottom face of the main body, at least a part of the sound output portion is provided in an area between a periphery of the lens barrel and the illumination unit on the front face of the main body, and
wherein, in a direction horizontal to the bottom face of the main body, at least a part of the sound output portion is provided in an area between tangent lines respectively tangent to both side outlines of the illumination unit.

4. The image-taking apparatus according to claim 3, wherein the sound output portion is a plurality of openings formed on the front face of the main body to output the sound.

5. An image-taking apparatus comprising:
a main body of the image-taking apparatus;
a lens barrel which is provided on a front face side of the main body;
an illumination unit which illuminates an object and is provided on a top face of the main body; and
a sound processing portion which processes sound, the sound processing portion being provided in the main body,
wherein, in a direction orthogonal to a bottom face of the main body, at least a part of the sound processing portion is provided in an area between a periphery of the lens barrel and the illumination unit in the main body, and
wherein, in a direction horizontal to the bottom face of the main body, at least a part of the sound processing portion is provided in an area between tangent lines respectively tangent to both side outlines of the illumination unit.

6. The image-taking apparatus according to claim 5, wherein the sound processing portion is a microphone through which the sound is input.

7. The image-taking apparatus according to claim 5, wherein the sound processing portion is a speaker through which the sound is output.

8. The image-taking apparatus according to claim 1, wherein the illumination unit is movable between a first position being retracted with respect to the main body and a second position for image-taking by a rotation around a predetermined axis.

9. The image-taking apparatus according to claim 3, wherein the illumination unit is movable between a first position being retracted with respect to the main body and a second position for image-taking by a rotation around a predetermined axis.

10. The image-taking apparatus according to claim 5, wherein the illumination unit is movable between a first position being retracted with respect to the main body and a second position for image-taking by a rotation around a predetermined axis.

* * * * *